Nov. 1, 1966  J. O. BEASLEY  3,283,301
VEHICLE SPEED ALTERATION INDICATOR
Filed April 10, 1964
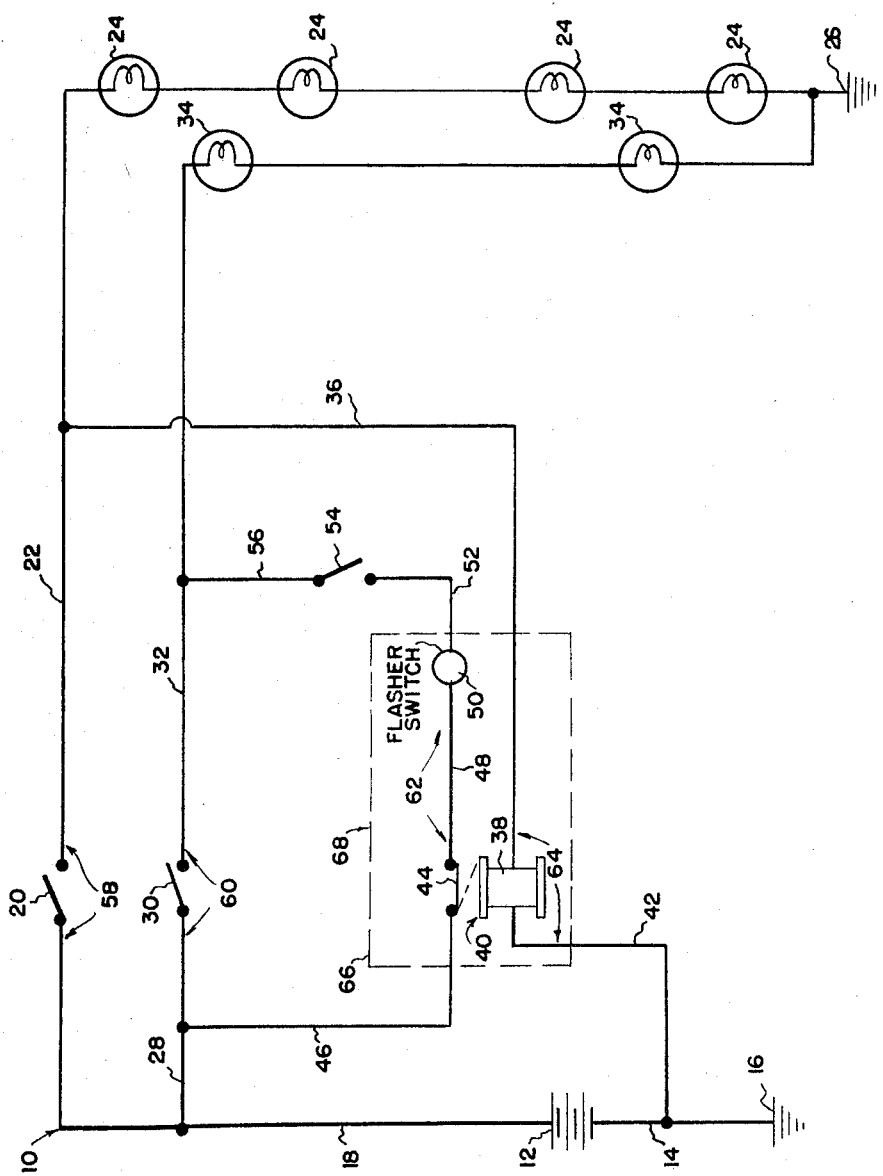
INVENTOR.
JACK O. BEASLEY.
BY
Barthel & Bugbee
ATTORNEYS.

3,283,301
VEHICLE SPEED ALTERATION INDICATOR
Jack O. Beasley, 7838 Terri Drive, Garden City, Mich.
Filed Apr. 10, 1964, Ser. No. 358,832
4 Claims. (Cl. 340—66)

This invention relates to automobile signalling lights and, in particular, to automobile speed alteration indicators.

Hitherto, particularly since the introduction of high speed expressways and turnpikes, many accidents resulted from a leading vehicle suddenly slowing down or "coasting" before applying its brakes to operate its so-called "stop lights." Occasionally, such slowing down or coasting of the leading vehicle has caused not only two-car rear-end collisions but also chain collisions involving more than two automobile closely following one another. The present invention provides an automobile speed alteration indicator which shows by flashing lights that the vehicle is about to slow down immediately in response to the operator's removing his foot from the accelerator pedal and before he applies his brakes. Moreover, the present invention accomplishes this without adding additional signal lights which might cause confusion as well as additional expense and difficulties in installation, but employs the vehicle's normal back-up lights for this purpose, optionally equipped with amber or other distinctive colored lens in place of the usual white back-up lenses.

Accordingly, one object of the present invention is to provide an automobile speed alteration or coasting caution indicator employing normal automobile back-up lights, which ordinarily emit a steady gleam in response to the closing of a back-up switch actuated by the transmission reverse lever to emit a flashing gleam whenever the operator during forward travel of the vehicle removes his foot from the accelerator pedal in order to coast and bring about a reduction in speed before applying, or without applying his brakes.

Another object is to provide an automobile speed alteration indicator of the foregoing character wherein the automobile back-up light switch circuit is provided with a bridging or bypass circuit containing a flasher switch, this circuit being energized to bridge around the back-up switch and actuate the back-up lights in flashing operation by the closing of a normally-open switch operated automatically in response to the removal of the operator's foot from the accelerator pedal before he actuates the brake pedal.

Another object is to provide an automobile speed alteration indicator of the foregoing character which is additionally equipped with a brake-responsive speed-alteration-indicator de-energization circuit which instantly de-energizes the back-up light bridging or bypass circuit and halts the flashing of the back-up lights when the operator applies his brakes.

Another object is to provide an automobile speed alteration indicator of the foregoing character wherein the de-energization circuit includes a relay and wherein the flasher switch and relay are contained in a housing with which they constitute a compact and easily-installed "package unit."

Other objects and advantages of the invention will become apparent during the course of the following description of the accompanying drawing which is a diagrammatic representation of an automobile back-up light speed alteration indicator, according to one form of the invention, with all circuits inoperative and no signal lights energized.

Referring to the drawing in detail, there is shown an automobile back-up light speed alteration indicator circuit, generally designated 10, according to one form of the invention as including and energized by the vehicle's usual storage battery 12, the ignition and other circuits of the vehicle being omitted to simplify disclosure. From one terminal of the storage battery 12, a line 14 leads to a ground connection 16, such as on the frame of the vehicle, whereas from the opposite terminal a line 18 leads to a normally-open brake switch 20 which is closed in response to the operation of the vehicle's brake pedal or other brake-applying member. From the brake switch 20, the line 22 containing the brake or stop lights 24 leads to another ground connection 26, such as the frame or metallic body of the vehicle which is electrically connected to the ground connection 16 and thereby closes the circuit therebetween. A line 28 also leads from the line 18 to a normally-open back-up light switch 30 which is closed in response to the actuation of the reverse lever or pushbutton or other reversing control member and from which a line 32 leads through back-up lights 34 to a ground connection, such as the ground connection 26 mentioned above. From the line 22, a line 36 leads to the operating coil 38 of a relay 40 whence a line 42 leads to the line 14 on the grounded side of the storage battery 12.

The relay 40 is provided with a normally-closed switch 44 to one side of which a line 46 leads from the line 28, and from the other side of which a line 48 leads to a thermostatically-operated flasher switch 50 from which a line 52 leads to a normally-open accelerator or other fuel control switch 54 which is closed in response to the release of the accelerator pedal resulting from the removal of the operator's foot from the accelerator pedal or other engine fuel control member in response to the consequent shifting of the linkage therefrom to the carburetor, in order to cause the vehicle to slow down or coast. From the accelerator switch 54, the line 56 runs to the line 32, thereby bridging, shunting or bypassing the back-up light switch 30 when the accelerator switch 54 is closed and the brake switch 20 remains open. For convenience, the circuit containing the lines 18 and 22 and the brake switch 20 and stoplights 24 is generally designated the stop light or braking warning circuit 28, whereas the circuit including the lines 28 and 32 containing the back-up light switch 30 and back-up lights 34 is generally designated the back-up light circuit 60. Moreover, the circuit consisting of the lines 46, 48, 52 and 56, the relay switch 44, the flasher switch 50 and the accelerator switch 54 is collectively or generally designated the speed alteration or coasting signal circuit 62, whereas the circuit containing the lines 36 and 42 and the relay operating coil 38 is collectively or generally designated the speed alteration or coasting signal de-energizing circuit 64. The relay 40 and the flasher switch 50 are consequently contained in a housing 66 which with them constitutes a compact and easily-installed "package unit," generally designated 68.

In the operation of the invention, let it be assumed that the vehicle is traveling normally along a highway with the operator's foot upon the accelerator pedal and consequently with the normally-open accelerator switch 54 remaining temporarily open. In this condition, the automobile is traveling at a steady speed requiring the application of power or is accelerating. At this time, the operator's foot is off the brake pedal, hence the normally-open brake switch 20 temporarily remains open and, of course, since the vehicle is not backing, the normally-open back-up light switch 30 also remains open.

When, however, the operator removes his foot from the accelerator pedal to slow down in level running or coast in down-hill running, the normally-open accelerator switch 54 immediately closes, thereby closing the speed alteration or coasting circuit 61 from the grounded storage battery 12 through the lines 18, 28, 46, 48, 52, 56 and 32 and the normally-closed and now closed relay switch 44, flasher switch 50 and normally-open but now closed accelerator switch 54 and back-up lights 34 to the ground connection 26. This action causes the back-up lights 34 to gleam with a flashing light in response to the intermittent action of the flasher switch 50. The latter is a conventional flasher switch and may be of the well-known type employing a thermally-operated switch using a bimetal to alternately close when cool and open when heated by the passage of current therethrough. As a result, drivers of following vehicles are instantly warned by the flashing of the back-up lights 34 that the operator of the leading vehicle has removed his foot from the accelerator pedal and that the leading vehicle will consequently slow down, if running on the level, or will coast, if running downhill. Accordingly, the drivers of the following vehicles will be instantly warned to also slow down or take evasive action to avoid a rear-end collision with the leading vehicle. If now the driver of the leading vehicle reapplies his foot to the accelerator pedal, the accelerator switch reopens, de-energizing the speed alteration circuit 62 and causing the back-up lights 34 to cease flashing.

If, on the other hand, the operator of the leading vehicle places his foot upon the brake pedal to apply his brakes, this action energizes the stop light circuit 58 by closing the normally open brake switch 20 and consequently closing and energizing the stop light circuit 58, causing the stop lights 24 to light and warn the drivers of following vehicles that the leading vehicle is being braked. This action, however, also energizes the speed alteration or coasting signal de-energizing circuit 64 through the lines 42 and 36 and the operating coil 38 of the relay 40, thereby opening the normally-closed relay switch 44 and instantly de-energizing the speed alteration or coasting signal circuit 62. As a result, the back-up lights 34 cease flashing and the stop lights 24 assume the signalling function of warning drivers of following vehicles that the leading vehicle is being braked and consequently its speed is being forcibly reduced. In the event that the vehicle has halted and the driver desires to back, he shifts his change speed lever to its reversing position, which in turn closes the normally-open back-up switch 30 and consequently energizes the back-up light circuit 60. As a result, the back-up lights 34 project a steady illumination rearwardly and, since the back-up switch 30 bypasses and hence overrides the coasting signal circuit 62 and its de-energizing circuit 64, neither the closing nor opening of the normally-open accelerator switch 54 has any effect upon the back-up lights 34 during backing of the vehicle.

Thus, according to the invention, the back-up lights 34 are utilized to perform the two separate functions of illuminating the space rearwardly of the vehicle to assist the driver in backing his vehicle as well as to warn the drivers of other vehicles that backing is taking place, and also during forward running has removed his foot from the accelerator so that the leading vehicle is about to slow down or coast.

What I claim is:

1. A speed-alteration indicator for installation in an automobile having an engine fuel control member, a brake-applying member and a source of electrical energy, said indicator comprising
    an automobile back-up light circuit electrically connected to said electrical energy source and including an electrically-energized back-up signal light and a normally-open back-up light control switch which is closed in response to reversing of forward direction of vehicle travel;
    and a vehicle speed alteration signal circuit connected in bridging relationship around said back-up light control switch and including a flasher switch and a normally-open accelerator switch which is closed in response to release of the engine fuel control member.

2. A speed-alteration indicator, according to claim 1, wherein the automobile is also equipped with an automobile braking warning circuit including a normally-open brake switch which is closed in response to the operation of the brake-applying member, and means responsive to the closing of said brake switch for de-energizing said speed alteration signal circuit.

3. A speed-alteration indicator, according to claim 2, wherein said means includes a relay having an operating coil in said braking warning circuit and having a normally-closed relay switch connected in energization-controlling relationship with said speed alteration signal circuit and opened in response to the energization of said relay operating coil in consequence of the closing of said brake switch by the operation of the brake-applying member.

4. A speed-alteration indicator, according to claim 3, wherein said indicator includes a housing and wherein said relay and said flasher switch are disposed in said housing and constitute therewith a compact and easily-installed package unit.

No references cited.

NEIL C. READ, *Primary Examiner.*

A. WARING, *Assistant Examiner.*